United States Patent [19]
Abbott et al.

[11] Patent Number: 5,999,281
[45] Date of Patent: Dec. 7, 1999

[54] HOLOGRAPHIC PROJECTION SCREEN COMBINING AN ELLIPTICAL HOLOGRAPHIC DIFFUSER AND A CYLINDRICAL LIGHT-COLLIMATOR

[75] Inventors: Lynore M. Abbott, New York, N.Y.; Michael M. Wenyon, Boston, Mass.

[73] Assignee: Polaroid Corporation, Cambridge, Mass.

[21] Appl. No.: 09/145,480

[22] Filed: Sep. 2, 1998

Related U.S. Application Data

[60] Continuation-in-part of application No. 09/073,518, May 6, 1998, which is a division of application No. 08/808,319, Feb. 28, 1997, Pat. No. 5,796,499.

[51] Int. Cl.[6] .............................. G02B 5/32; G02B 5/02; G02B 21/60; B32B 31/00
[52] U.S. Cl. ........................... 359/15; 359/599; 359/641; 359/456; 156/166
[58] Field of Search .............................. 359/15, 16, 599, 359/641, 456, 457; 156/166

[56] References Cited

U.S. PATENT DOCUMENTS

| | | | |
|---|---|---|---|
| 3,909,111 | 9/1975 | Meyerhofer | 350/117 |
| 4,372,639 | 2/1983 | Johnson | 350/3.7 |
| 4,374,609 | 2/1983 | Lange | 350/128 |
| 4,573,764 | 3/1986 | Bradley | 350/128 |
| 4,575,192 | 3/1986 | Duthie et al. | 350/3.69 |
| 4,586,780 | 5/1986 | Chern et al. | 350/3.7 |
| 4,586,781 | 5/1986 | Gunther et al. | 350/3.7 |
| 4,642,736 | 2/1987 | Masuzawa et al. | 362/31 |
| 4,762,393 | 8/1988 | Gerritsen et al. | 350/128 |
| 4,919,515 | 4/1990 | Hasegawa et al. | 350/128 |
| 5,046,793 | 9/1991 | Hockley et al. | 359/12 |
| 5,066,099 | 11/1991 | Yoshida et al. | 359/457 |
| 5,365,354 | 11/1994 | Jannson et al. | 359/15 |
| 5,390,085 | 2/1995 | Mari-Roca et al. | 362/31 |
| 5,408,282 | 4/1995 | Nagashima et al. | 353/77 |
| 5,534,386 | 7/1996 | Peterson et al. | 430/320 |
| 5,576,853 | 11/1996 | Molteni et al. | 359/12 |
| 5,663,816 | 9/1997 | Chen et al. | 359/15 |
| 5,889,612 | 3/1999 | Van De Ven | 359/453 |

OTHER PUBLICATIONS

Tedeso et al., Holographic Diffusers for LCD Backlights and Projection Screens, SID 93 Digest, Ch. 5.3, p. 29 et seq. (1993).

Meyerhofer, Dietrich, Holographic and Interferometric Viewing Screens, Applied Science, vol. 12, No. 9, Sep. 1973.

Middleton, et al., The Diffusion of Light By Ground Glass, With Special Reference to Color Changes, Canadian Journal of Research, vol. 27, Sec. F., Nov. 1948.

Wenyon et al., Mass Production of Volume Holographic Diffusers, 1994 SID International Symposium Digest of Technical Papers, San Jose, CA (Jun. 14–16, 1994)(ISSN 0097–966X).

Wadle, et al., Holographic Diffusers, Optical Engineering, vol. 33, No. 1, Jan. 1994.

*Primary Examiner*—Jon Henry
*Attorney, Agent, or Firm*—Renato M. de Luna

[57] ABSTRACT

A projection screen having a construction well-suited for effecting lateral color constancy in rear screen projection display systems is disclosed. The projection screen includes a holographic transmission diffuser element capable of diffusing a beam of light into a horizontally-elliptical cone and a light-collimating element for uniaxially-collimating by transmission an expanding wavefront with the axis of collimation substantially orthogonal to a horizontal viewing axis. The use of the projection screen in a rear screen projection display system including red, green and blue image projectors is also disclosed. A method of manufacturing a holographic projection screen by drawing a holographic transmission diffuser web and a uniaxial light collimating web into overlapping relationship and bonding the webs is also disclosed.

12 Claims, 10 Drawing Sheets

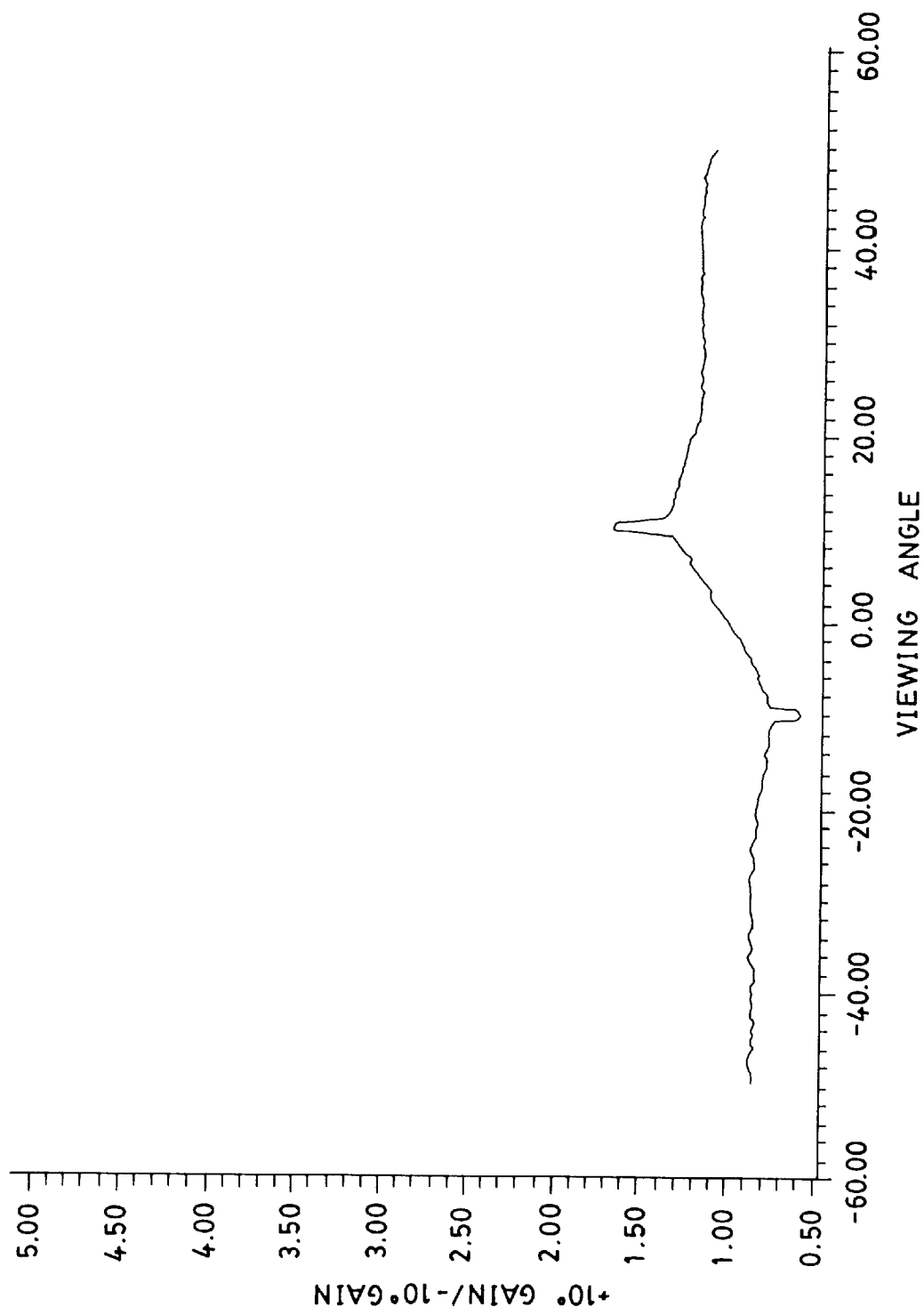

HOLOGRAPHIC PROJECTION SCREEN COMBINING AN ELLIPTICAL HOLOGRAPHIC DIFFUSER AND A CYLINDRICAL LIGHT-COLLIMATOR

REFERENCE TO PARENT APPLICATIONS

The present application is a continuation-in-part of U.S. patent application Ser. No. 09/073,518, filed May 6, 1998, which is a division of U.S. patent application Ser. No. 08/808,319, filed Feb. 28, 1997, now U.S. Pat No. 5,796,499.

FIELD OF THE INVENTION

The present invention is directed to a highly efficient transmission holographic diffuser and to a rear screen projection television having a screen incorporating said holographic diffuser, said screen capable of directing chromatically-balanced diffuse light substantially throughout its entire surface.

BACKGROUND

Diffusers are used to scatter light such that an object within the resultant diffuse light pattern is illuminated uniformly by light propagating from a substantially increased number of angular directions.

Conventional diffusers are typically made from a glass pane or a plastic sheet processed to have a light scattering refractive surface and/or impregnated with dispersed light scattering diffractive particles. A typical diffuser might be the light-transmissive shell of a frosted light bulb, or a ground glass plate or other rough surface facing a light source for the diffuse reflection of light originating therefrom. Conventional diffusers have been used in the display industry, for example, to define the quality (cf., angular distribution) and quantity (cf., brightness) of image light available to a viewer.

Important parameters considered in the design of a diffuser are the uniformity of the projection of light transmitted or reflected in two dimensions, the efficiency of transmission or reflection as a function of wavelength over the visible wavelength region, and the solid angle of view for which the diffuser is operational. Conventional diffusers are generally limited in their capacity to accomplish desirable results in any one of these parameters without some sacrifice to the others. Holographic diffusers—having good forward scattering properties—are not so limited, and are lighter, more compact, and can generally be formed and replicated with comparatively greater ease. A holographic diffuser can provide high uniformity, high forward efficiency (i.e., with minimum backscatter) and a controllable solid angle of view largely independent of incident angle.

The inherent and controllable properties of holographic diffusers has generated interest in their application to image display systems. For example, reflective holographic diffuser elements have been employed to effect the illumination of liquid crystal displays and like electrooptical displays. See e.g., PCT International Publication No. WO 95/12826, published May 11, 1995; U.S. Pat. No. 5,659,408, issued to M. M. Wenyon on Aug. 19, 1997; and U.S. Pat. No. 5,418,631, issued to J. M. Tedesco on May 23, 1995. Likewise, the use of transmissive holographic diffusers have been employed in place of traditional light diffusing lenticular optics in rear projection screen television systems. See, e.g., D. Meyerhofer, Holographic and Interferometric Viewing Screens, APPLIED OPTICS, Vol. 12, No. 9 (September 1973); U.S. Pat. No. 3,909,111, issued to D. Meyerhofer on Sep. 20, 1975; J. M. Tedesco et al., Holographic Diffusers for LCD Backlight and Projection Screens, SID 1993 DIGEST, Ch. 5.3, pp. 29–32 (1993); U.S. Pat. No. 5,365,354, issued to Jannson et al. on Nov. 15, 1994; and U.S. Pat. No. 5,534,386, issued to Petersen et al. on Jul. 9, 1996.

While the above references report advances in screen resolution, brightness, efficiency, and image scattering, they do not address or acknowledge or are concerned with the long-standing problem of lateral color shift—a problem especially pronounced in multi-"color tube" projector systems and still addressed for the most part with conventional non-holographic solutions. See U.S. Pat. No. 4,374,609, issued to H. G. Lange on Feb. 22, 1983; U.S. Pat. No. 4,573,764, issued to R. H. Bradley on Mar. 4, 1986; U.S. Pat. No. 4,762,393, issued to G. B. Gerritsen on Aug. 9, 1988; U.S. Pat. No. 4,919,515, issued to S. Hasegawa et al. on Apr. 24, 1990; and U.S. Pat. No. 5,066,099, issued to T. Yoshida et al. on Nov. 19, 1991. Unfortunately, conventional solutions—such as the use of a lenticular sheet having a vertically-striped pattern of light-absorbers and light-bending lenticules ("black stripe")—are accomplished with sacrifices to image resolution and brightness. The present invention provides a holographic solution.

Color projection systems generally employ three picture tubes, one for each of the primary colors. In the conventional arrangement only one centrally located picture tube is aligned with the normal axis of the projection screen, and the other two are laterally displaced therefrom. Since the scattering pattern effected by conventional diffusing optics is largely dependent on incident input angles, the angular variance of the offset tubes results ultimately in different mixes of signal strengths at different horizontal viewing locations. Because each tube projects a different color, these different signal strength mixes—without optical correction—will be perceived as different color balances. Thus, while a viewer in a central viewing zone may see a chromatically-balanced image, those in viewing zones to the left and right may see, for example, a red-dominant image or a blue-dominant image.

The existing difficulty in accomplishing good color balance in rear projection screen televisions through holographic means can be attributed to the impracticality of current holographic color correction strategies. The known strategies are not easily amenable to the manufacture of a hologram having the appropriate screen optics, i.e., a hologram capable of scattering diffuse light homogeneously throughout a relatively wide horizontal viewing zone. For example, in their attempt to provide a display having multiple discrete off-axis fields of view (see, U.S. Pat. No. 5,046,793, issued Sep. 10, 1991), Hockley and Pawluczyk suggest designing a holographic diffuser by a stepped methodology to provide chromatic correction within predetermined "eyeboxes". For each eyebox, several angle-specific holographic exposures are recorded that provide collectively the appropriate mix of signal strengths within said eyebox. While the Hockley and Pawluczyk method may be useful for designing heterogeneous displays having two or more discrete viewing zones, the methodology would require an impractical number of holographic exposures to define good diffusing properties homogeneously and in perceived continuum throughout a wide viewing angle.

In light of the above, need is present for a comparatively easy-to-manufacture holographic transmission diffuser, especially those capable of effecting homogenous lateral color constancy in rear projection screen displays.

SUMMARY

The present invention provides a transmission holographic diffuser element suitable for use innovatively in a projection screen in place of the typical combination of a physical diffuser and a front lenticular element. The holographic transmission diffuser element is of a construction that, upon illumination with a light beam having a wavelength of 400 nm to 700 nm and impinging at an incident input angle of approximately ±0° to 30° relative to normal incidence measured in a horizontal plane (i.e., laterally), produces in transmission therethrough a single diffuse output lobe, which is also, in a desirable embodiment, horizontally elliptical. When assembled with appropriate collimating mean (cylindrical in said desirable embodiment), the diffuse output lobe produced in one area of said holographic transmission diffuser element has a relative angular intensity distribution and aspect ratio substantially identical to the relative angular intensity distribution and aspect ratio of diffuse output lobes produced in substantially all other areas of said holographic transmission diffuser element. By the collective influence of such features, the resultant projection screen can be used to receive the confluence of image-bearing irradiation projected within a multi-tube projection television system and display to a horizontally distributed viewing audience a bright, wellresolved, and "stripeless" image having good side-to-side color balance.

The features of the transmission holographic diffuser element central to the desired operation of the projection screen are derived holographically in its manufacture from a master transmission diffuser (H1). The method of making the H1 master hologram—itself an innovative process—is characterized by its step of scanning a photosensitive recording medium with a strip of diffuse irradiation transmitted through a source diffuser, the source diffuser spaced proximate to but sufficiently away from the recording medium to effect significant "overlap mismatch" phenomena in the resultant holographic recordation. In addition to its versatility in the manufacture of master transmission holographic diffusers of various formats and optical properties, the method can be performed within a continuous web production line, thereby opening an avenue for reducing manufacturing costs.

Aside from its ability to mitigate lateral color shift, the high efficiency of the holographic transmission diffuser element can provide advantage in applications where good color balance is of little or no importance. Such applications include computer monitors and micrographs; backlight diffusing films for liquid crystal displays; planar optical components that increase the viewing zone of a display preferentially in one direction; planar optical components that control the scattering of light from automotive signal lights; planar optical components for diffusing artificial illumination from banks of electric lights; and films coated, laminated, or otherwise deposited on windows for the purpose of diffusing daylight deep within a building's interior.

In light of the above, it is an object of the present invention to provide a holographic projection screen capable of chromatically self-correcting light received from angularly-offset color-dedicated image projectors to achieve substantially uniform lateral color-balance in a resultant color-combined image.

It is another object of the present invention to provide a projection screen comprising a rigid light-transmissive faceplate; a light collimating element; and a holographic transmission diffuser element that upon illumination with a light beam, having a wavelength of 400 nm to 700 nm and impinging at an incident input angle of ±0° to 30° relative to normal incidence in a lateral direction, produces a single diffuse output lobe, the diffuse output lobe produced in one area of said holographic transmission diffuser element having a relative angular intensity distribution and aspect ratio substantially identical to the relative angular intensity distribution in substantially all other areas of said holographic transmission diffuser element.

It is another object of the present invention to provide a method for making a holographic diffuser, particularly a master transmission holographic diffuser (H1), wherein a photosensitive recording medium is scanwise-exposed to diffuser-modulated wavefronts produce by the transmission of a uniaxially expanded beam through a source diffuser, the source diffuser proximate to but spaced slightly apart from the surface of said photosensitive recording medium, resulting in a holographic recordation characterized by significant "overlap mismatch", the holographic recordation, capable of being played back as a diffuse elliptical light pattern.

It is another object of the present invention to provide a compact rear screen projection screen television, employing an array of short focal length image projectors positioned with a relative horizontal offset angle of greater than about 13°.

It is another object of the present invention to provide a projection screen comprising a large-area cylindrical fresnel lens combined with an elliptical holographic transmission diffuser having cylindrical (or pseudo-cylindrical) focusing power in an orthogonal axis.

Other objects of the present invention will become apparent from the following detailed description taken in conjunction with the accompanying drawings.

BRIEF DESCRIPTION OF THE DRAWINGS

FIG. 6A is a graph plotting differential gain against viewing angle resultant of irradiating an inventive holographic transmission diffuser element with beams of light impinging at incident angles of ±10°, the differential gain being the quotient of the gain accomplished at +10° incidence and the gain accomplished at −10° incidence.

DETAILED DESCRIPTION

By the present invention, there is provided a projection screen 10 having a construction well-suited for receiving converging wavefronts propagated from a plurality of angularly-offset light sources, and transmitting therethrough substantially equivalent overlapping lobes of diffuse light substantially throughout the predetermined extents of its viewing surface. The projection screen 10 is especially suitable for use in combination with image projection means located rearwardly of said screen for displaying an image to a plurality of observers located at viewing positions which are on the front side of said screen and dispersed horizontally in a direction parallel to said screen, and wherein said image projection means comprise an array of "single color"-dedicated projectors (cf., cathode ray tubes, CRTs) for projecting corresponding single-color images onto said screen, the projected single-color images overlapping in registration and combining to produce a single multicolor image. Used in such application, the projection screen 10 is characterized by its efficacy in displaying a bright, well-resolved, and "stripeless" image having stable side-to-side color balance.

While several embodiments and applications of the invention are envisioned, to facilitate presentation and understanding of its subject matter, reference is made to a rear screen projection television system 70 equipped with projection means comprising a red, a green, and a blue monochromic projection-type CRT, 40$_R$, 40$_G$, and 40$_B$. As a matter of practice, however, a system in which the number of CRTs is increased to six, nine, or the like; a system in which liquid-crystal elements are used instead of CRTs as the video source; a system in which a color image on a video source such as a slide, a motion picture film, etc., is projected by a single projection lens; and other like projection display systems, can constitute embodiments and/or applications of the invention.

Figure 3A:
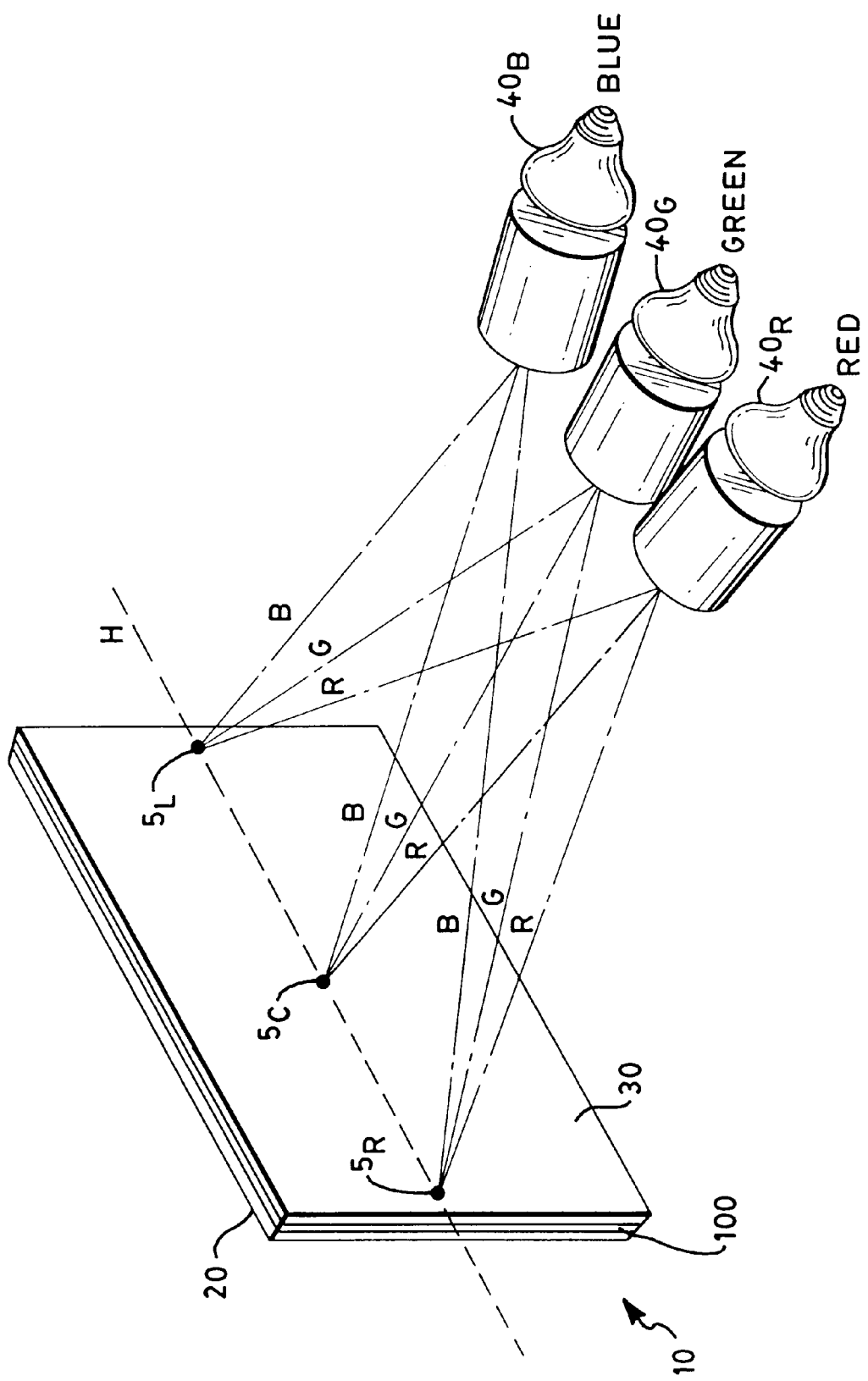
FIG. 3A illustrates schematically the projection of beams of light onto an inventive projection screen 10 from a lateral array of three light sources $40_R$, $40_G$, and $40_B$, light sources $40_R$ and $40_B$ each offset by 10° from the central light source $40_G$. The optical path is simplified (i.e., straight; without redirection effected by reflectors and the like) to facilitate presentation and discussion.

Referring to FIG. 3A, the inventive projection screen 10 comprises a rigid light-transmissive faceplate 20 and a holographic transmission diffuser element 100 proximate said faceplate. Faceplate 20 can be made from glass, or rigid polymeric sheet materials made from, for example, polysterene, polyethylene, polyethylene terephthalate, polypropylene, poly(vinyl chloride), polycarbonate, poly(vinylidene chloride), cellulose acetate, cellulose acetate butyrate, and copolymeric materials, such as the copolymers of styrene, butadiene, and acrylonitrile. Although the holographic transmission diffuser element 100 will for purposes of protection be placed behind the faceplate 20, the positioning is not critical, and may be changed to accommodate the particular design requirements of the desired application. When used for rear screen projection television system 70, faceplate 20 preferably constitutes an essentially zero-power optical element (i.e., optically inactive and substantially non-distorting) and transmissive of the color separation images projected in overlapping registration by said system 70 for combination into a multicolor image.

In embodiments wherein holographic transmission diffuser element 100 is essentially contiguous with faceplate 20 (such as illustrated in FIG. 3A), positioning (i.e., mounting) can be accomplished by the use therebetween of a suitable pressure, heat, and/or light activated adhesive (not shown). The adhesive may contain optionally such other desired components as anti-static compositions, color dye tints, neutral density tints, optical brighteners, inert fillers, and plasticizers. Mounting can be accomplished in several ways depending on the nature of the materials selected for faceplate 20, the adhesive, and diffuser element 100.

The holographic transmission diffuser element 100 provides the critical display functionality of the present invention and comprises a planar hologram layer deposited on a light-transmissive substrate. The planar hologram layer and light-transmissive substrate of holographic transmission diffuser element 100 are not shown in the drawings, but—in terms of schematic structure and arrangement—are identical to photosensitive layer 110 and substrate 120 of the H1 transmission diffuser 100' illustrated in FIG. 1.

The holographic transmission diffuser element 100 has a construction such that upon illumination of an area of said diffuser element 100 with a light beam having a wavelength of 400 nm to 700 nm, and impinging at an incident input angle of ±0° to 30° relative to normal incidence, said holographic transmission diffuser element 100 produces a single diffuse output lobe when viewed in a horizontal plane. Importantly, the holographic transmission diffuser element 100 is made so that the diffuse output lobe produced in one area of said diffuser element 100 has a relative angular intensity distribution and an aspect ratio substantially identical to the relative angular intensity distribution and aspect ratio of diffuse output lobes produced in substantially all other areas of said diffuser element 100.

As would be apparent to skilled practitioners, the diffuse output lobes are not tangible physical structures, but rather represent a qualitative characterization of certain optical phenomena effected by the transmissive holographic diffuser element 100. Because of their role in the causation of lateral color shift, the optical phenomena of concern herein is angular intensity and aspect ratio. The substantial identity of these two parameters, constant for a predefined range of input beam properties, is indicative of the physical structure of the holographic transmission diffuser which is otherwise difficult to quantify.

Figure 2A:
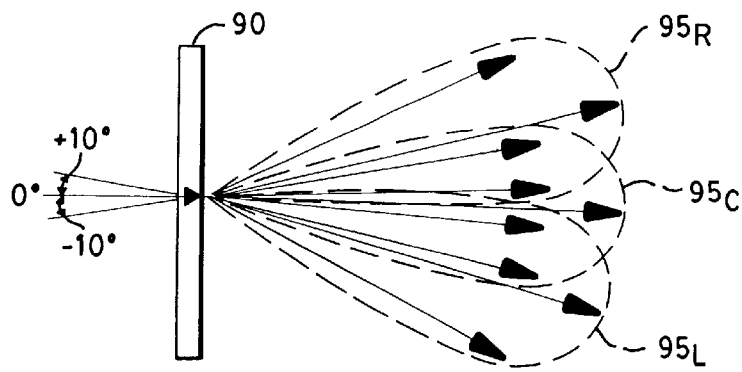
FIGS. 2A to 2C illustrate schematically the diffuse output lobes produced at 0°, and ±10° incident angles for conventional glass diffusers (FIG. 2A), conventional holographic diffusers (FIG. 2B), and high-efficiency holographic transmission diffusers (FIG. 2C) according to the present invention.
Figure 2B:
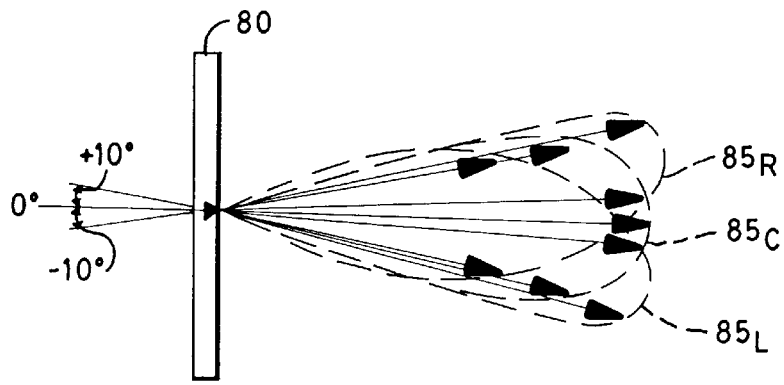
Figure 2C:
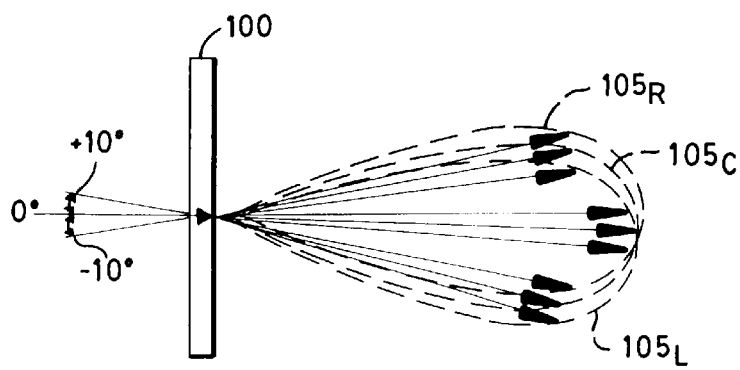

The particular details of the projector screen 10's unique pattern of diffuse output lobes can be understood with reference to FIGS. 2A to 2C. As shown, normal incident light, light incident at +10°, and light incident at −10° are transmitted through the holographic projector screen 10 such that the resultant diffuse output cones (i.e., the scattering lobe) are each projected at substantially similar angular directions. Essentially, the scattering lobe remains stationary relative to the diffuser for all angles of incident light within that scattering lobe. As shown in FIGS. 2A to 2C, this is very different from the operation of a conventional diffuser.

While stationary scattering lobes—as observed by Tedesco et al.—are characteristic of holographic diffusers, the projection screen of the present invention produces more than just the typical holographic response. As also shown in FIGS. 2A to 2C, the intensity of the light component in each of the resultant scattering lobes, are substantially similar at each angle of diffraction. Thus, when the incoming light from red, green, and blue projectors impinge, the cones of diffusion produced at each point are not only directed to the same locations; but also—and most importantly—produce substantially overlapping chromatic intensities. Thus, when provided with appropriately collimated light, lateral red and blue color shift in rear screen projection televisions is noticeably reduced.

More particularly, FIG. 2A illustrates schematically the diffuse scatter lobes $95_R$, $95_C$, and $95_L$ resultant of illuminating a conventional ground glass diffuser 90 with beams of light incident at −10°, 0°, and +10°, respectively. As shown, the scattering lobe does not remain stationary relative to the diffuser for all angles of incident light within that scattering lobe. Rather, the directionality of the lobe corresponds proportionately to the incidence angle of the input beam. The result, for rear screen projection display systems, is a highly variable distribution of light intensities along the horizontal axis, which manifests as a dramatic shift in color perceptible to a viewer moving along said axis.

FIG. 2B illustrates schematically the diffuses scatter lobes $85_R$, $85_C$, and $85_L$ resultant of illuminating a conventional holographic diffuser 80 with beams of light incident at −10°, 0°, and +10°, respectively. Although the more stable angular directionality of resultant scatter lobes is an improvement over ground glass diffuser 90, the intensity distribution for each lobe is both qualitatively and quantitatively different. Thus, as apparent from FIG. 2B, the mix of the light components directed to viewer at 10° from the central viewing axis is far greater for diffuse lobe $85_R$, than diffuse lobe $85_L$. Where the projectors are dedicated color projectors, such variance in intensities—while greatly improved in comparison with conventional glass diffusers—would still lead to a noticeable degree of color shift.

In contrast to the scatter definitions designed into the diffusers 90 and 80 of FIGS. 2A and 2B, respectively, the holographic transmission diffuser 100 of FIG. 2C is defined in a manner suitable for the production of substantially overlapping diffusion lobes $95_R$, $95_C$, and $95_L$. More particularly, FIG. 2C illustrates schematically the diffuses scatter lobes $95_R$, $95_C$, and $95_L$ resultant of illuminating a conventional ground glass diffuser 90 with beams of lights incident at −10°, 0°, and +10°, respectively.

Figure 5A:
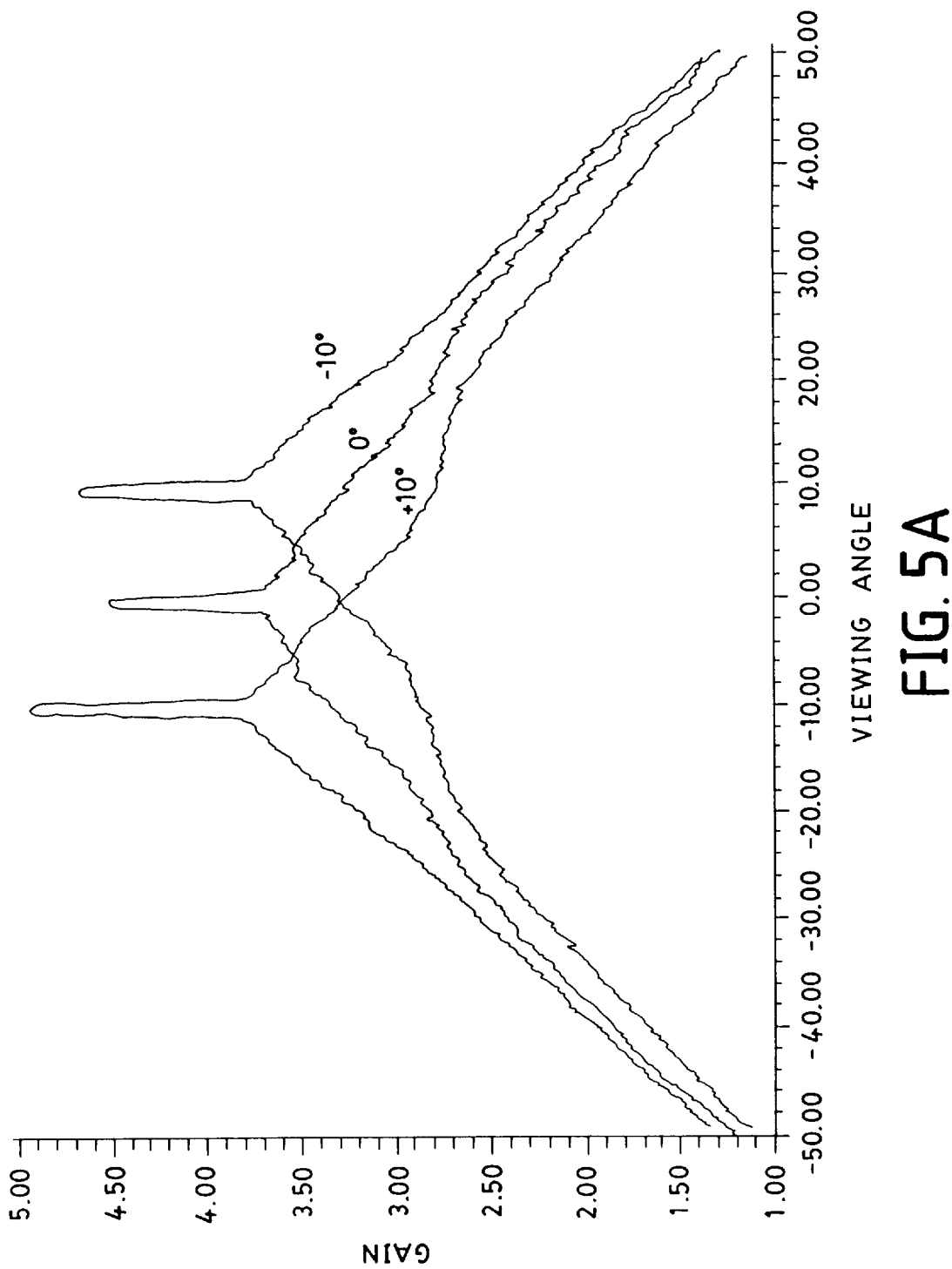
FIG. 5A is a graph plotting gain against viewing angle resultant of irradiating an inventive holographic transmission diffuser element with a beam of light impinging at incident angles of 0° and ±10°.
Figure 5B:
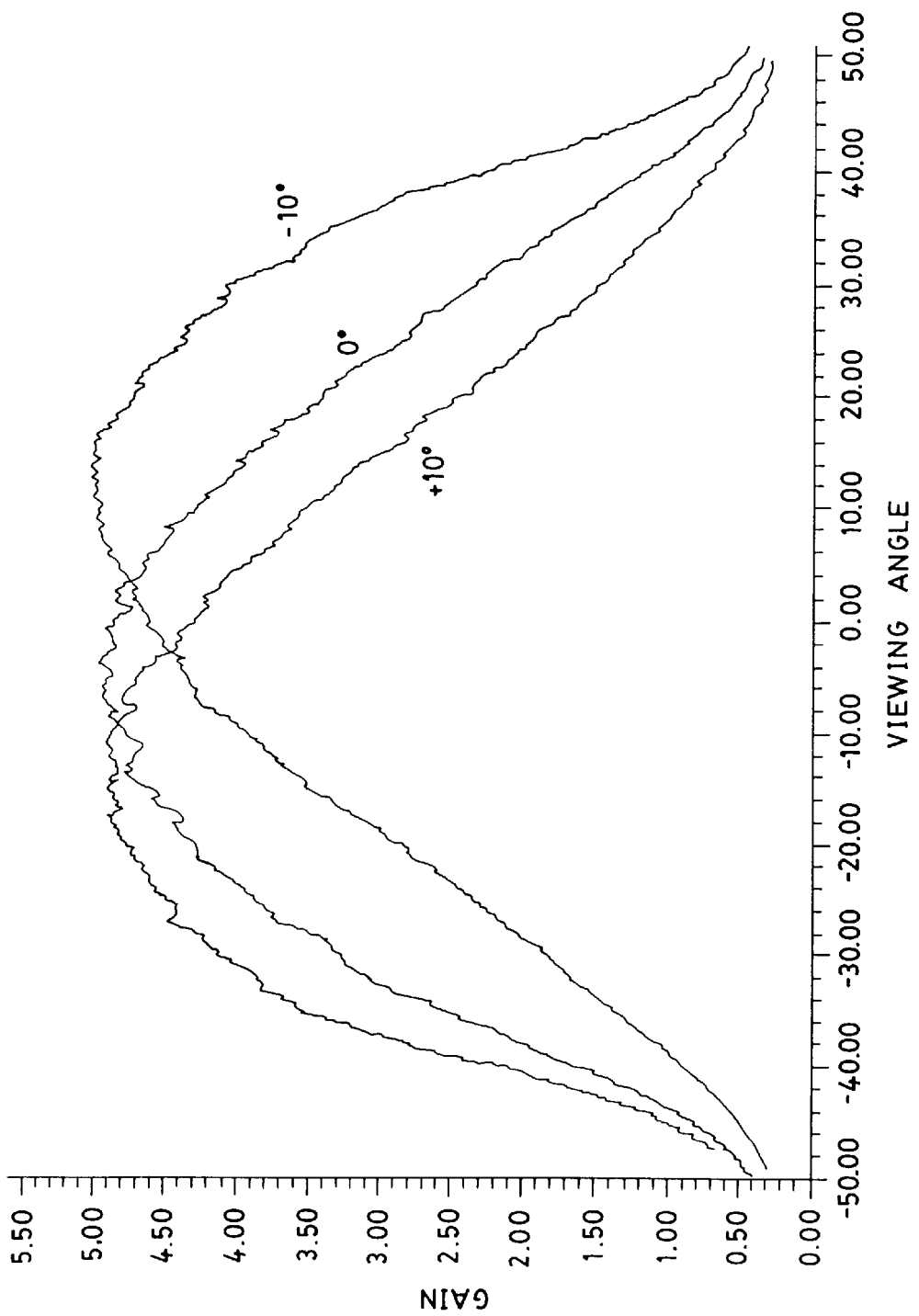
FIG. 5B is a graph plotting gain against viewing angle resultant of irradiating a conventional glass diffuser with a beam of light impinging at incident angles of 0° and ±10°.
Figure 6B:
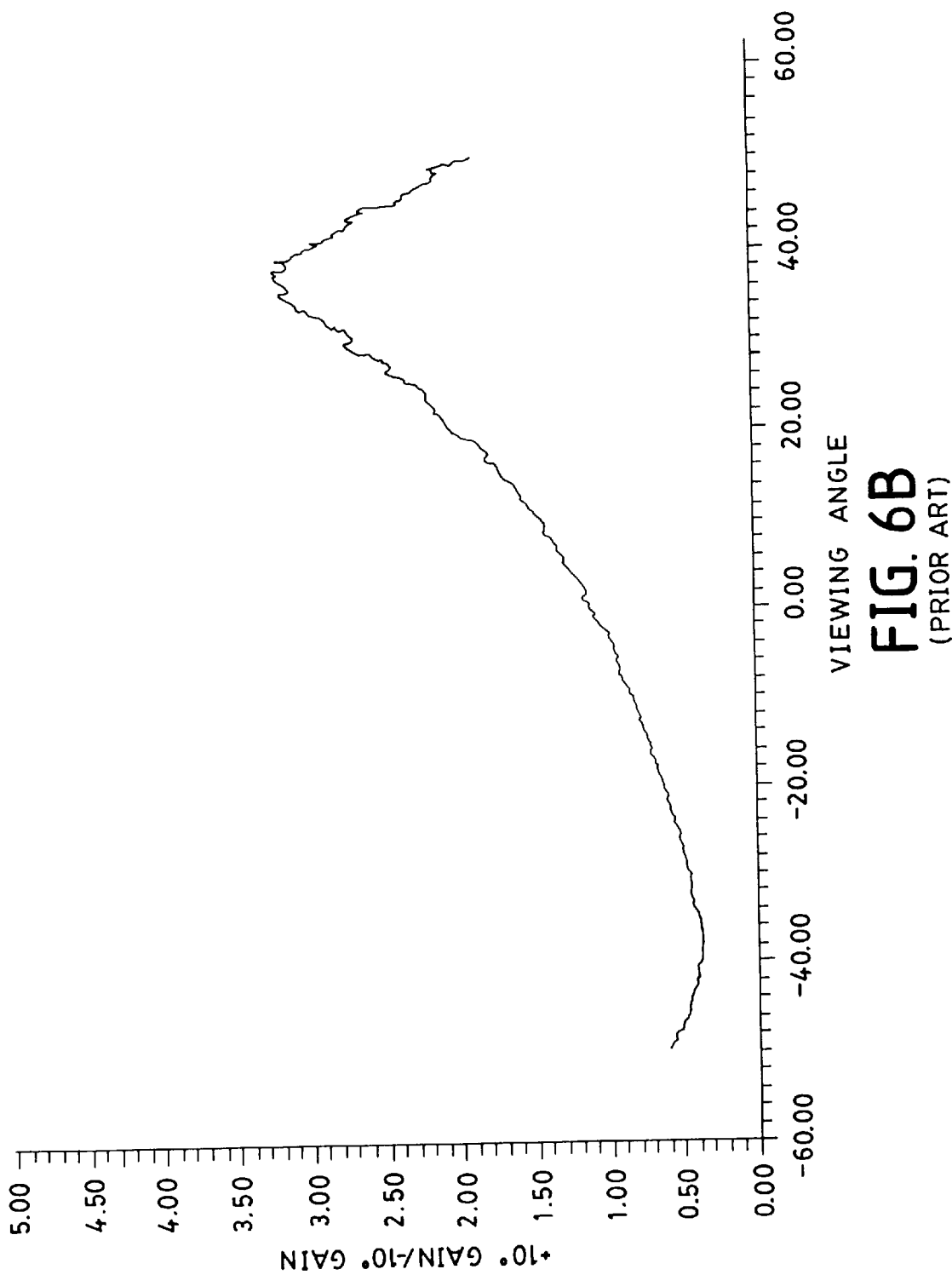
FIG. 6B is a graph plotting differential gain against viewing angle resultant of irradiating a conventional glass diffuser with beams of light impinging at incident angles of ±10°, the differential gain being the quotient of the gain accomplished at +10° incidence and the gain accomplished at −10° incidence.

To better appreciate the differences illustrated graphically in FIGS. 2A, 2B, and 2C, reference can be made to FIGS. 5A and 5B, and FIGS. 6A and 6C. As stated in the "Brief Description of the Drawings" above, FIG. 5A is a graph plotting gain against viewing angle resultant of irradiating holographic transmission diffuser element 100 with a beam of light impinging at incident angles of 0° and ±10°, whereas FIG. 5B plots the values resultant of irradiating a conventional glass diffuser with a beam of light impinging at incident angles of 0° and ±10°. In comparing FIGS. 5A with 5B, the overlap of gain profiles at the various angles of incidence is moreso pronounced and apparent in the output of holographic transmission diffuser element 100, than in the output of the conventional diffuser. Similar observations can be drawn form FIGS. 6A and 6B. FIGS. 6A and 6B are obtained by plotting the quotient of gain at +10° incidence and gain at −10° incidence, using the corresponding values of FIG. 5A and FIG. 5B. Again, a comparatively greater uniformity in the gain throughout the range of incident angles is moreso apparent in the output of holographic transmission diffuser element 100 (FIG. 6A), than in the output of the conventional diffuser (FIG. 6B).

While the output lobe illustrated in FIG. 2 is shown symmetrical to an axis normal to the plane of the projection screen 10, it will be appreciated that the position of the scatter lobe may be altered consistent with the invention relative to the surface normal. Such off-axis scatter lobes can be employed, for example, to optimize chromatically-balanced viewing brightness in certain rear-screen projection television systems, wherein—for any variety of design reasons—the nominal viewing position is significantly off-axis. The methodology by which off-axis scattering functionality can be designed into diffuser element 100 is discussed further below.

To ensure that the output lobes produced by the projection screen 10 are—in accordance with the invention—uniform throughout its extents, it is important to make consistent the angular incidence of the input beam arriving from the offset projectors. This can be accomplished by incorporating into the screen means for collimating light, said means being such that beams of light from within a diverging wavefront originating and spreading from an offset projector are collimated with respect to the central optical axis of said projector. Thus, for example, beams of light originating from a projector offset 10° from normal will on, account of said collimating means, be introduced into holographic transmission diffuser 100 at 10° incidence despite the relative angular divergence of said beams away from the optical axis of said projector.

Optics such as a fresnel lens (or a holographic equivalent thereof) 30 are quite suitable for this purpose. Alternatively, the functionality of collimating optics can be designed into the holographic transmission diffuser itself. However, because such design is complicated and difficult to implement inexpensively, such configurations are commercially undesirable.

While the typical light-collimating elements used for projection display purposes—i.e., those possessing spherical optical properties providing collimation relative to both horizontal and vertical axes—can provide good results for most display applications, the biaxial asymmetry of their surface topology makes difficult and impractical, if not altogether forecloses, their manufacture by continuous web processes. This biaxial asymmetry (herein, the condition of having different cross-sectional topological profiles from top-to-bottom and side-to-side) virtually compels that such collimators be individually molded or casted, steps that often increase a producer's overall manufacturing costs.

To the extent that manufacturing costs are of concern in the production of a projection screen according to the present invention, instead of using of a spherical light-collimating element (i.e., a biaxial light-collimator), one can—with relatively little sacrifice to optical output—employ a light-collimating element possessing cylindrical light-collimating properties (i.e., uniaxial light collimation).

Basis for such substitution derives in part from from the unique properties of the horizontally-elliptical holographic transmission diffusers used in embodiments of the present invention. In particular, these elliptical holographic diffusers are configured to diffuse a beam of light into a cone having a forwardly-projected horizontally-elliptical base. Since, by definition, this property is substantially constant for beams of visible light impinging at an incident input angle of approximately ±0° to 10° relative to normal incidence, the holographic transmission diffuser element essentially already has a "quasicollimating" capacity along its horizontal (side-to-side) viewing axis. Hence, if biaxial collimation is desired, one can within reason chose to pre-collimate the input light only along the vertical axis, particularly by using a cylindrical light-collimator, which essentially is a collimator that collimates light linearly (i.e., along one axis only).

While there will be a measurable difference in the optical output, the difference will likely be imperceptible, slight, or otherwise unimportant to overall viewing experience by contemplated users of such displays. In any event, by increasing the lateral light-bending efficiency of the holographic transmission diffuser as discussed further below, one can counter to some degree any shortfall resultant of the elimination of actual horizontal pre-collimation.

Figure 7:
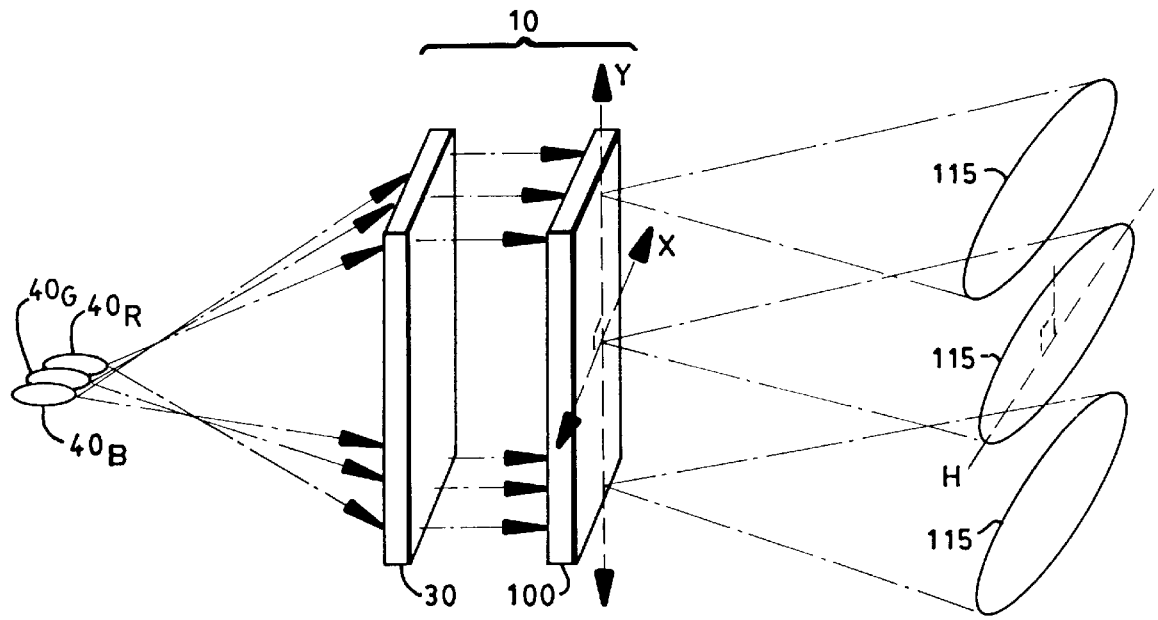
FIG. 7 illustrates schematically the diffuse optical output of a particularly desirable projection screen 10 (shown in an exaggerated, exploded view) comprising an elliptical holographic transmission diffuser element 100 and a uniaxial light-collimating element 30.

In further explanation of the co-operative functionality of its elliptical holographic and cylindrical collimating elements, the optics of a representative holographic projection screen 10 is illustrated schematically in FIG. 7. Therein, there is shown: projectors $40_R$, $40_G$, and $40_B$; cylindrical light-collimating element 30; and elliptical holographic transmission diffuser 100. Image-information bearing light is projected from each of projectors $40_R$, $40_G$, and $40_B$ and propagates forward, each wavefront expanding relative to both the indicated x- and y-axes, prior to ultimately impinging upon cylindrical light-collimating element 30. Transmitted therethrough, the impinging light is pre-collimated only along the y-axis, then passes through elliptical holographic transmission diffuser 100. (Despite the schematic presentation of FIG. 7, cylindrical light-collimating element 30 is typically in practice positioned in abutment with or in close proximity to elliptical holographic transmission diffuser 100.) The elliptical holographic transmission diffuser 100 then "quasi-collimates" the light in the horizontal x-axis, resulting for each beam of light in the production of a horizontally elliptical diffuse cone of light 115 (i.e., "horizontal" in the sense that longest diametric axis H of the cone 115 is substantially parallel to the horizontal viewing axis x).

The principal benefit of employing a cylindrical light-collimating element 30 derives from its surface topology. Unlike a "spherical" light-collimating element, the lenticules of a "cylindrical" light-collimating element have a linear symmetry. Each cross section along a lateral linear axis of the light-collimating element 30 will have substantially similar cross-sectional profiles. This lends itself quite naturally to manufacture by, for example, extrusion and embossing, processes capable of being accommodated within a continuous web methodology. In consideration of costs, a continuous web methodology is generally preferable over casting, molding, and like operations.

Thus, it is possible in the construction of a projection screen 10, to bring a continuous web of the light-collimating element 30 into interface with a continuous web of a holographic transmission diffuser 1000, followed by lamination and, for example, die-cutting.

Figure 8:
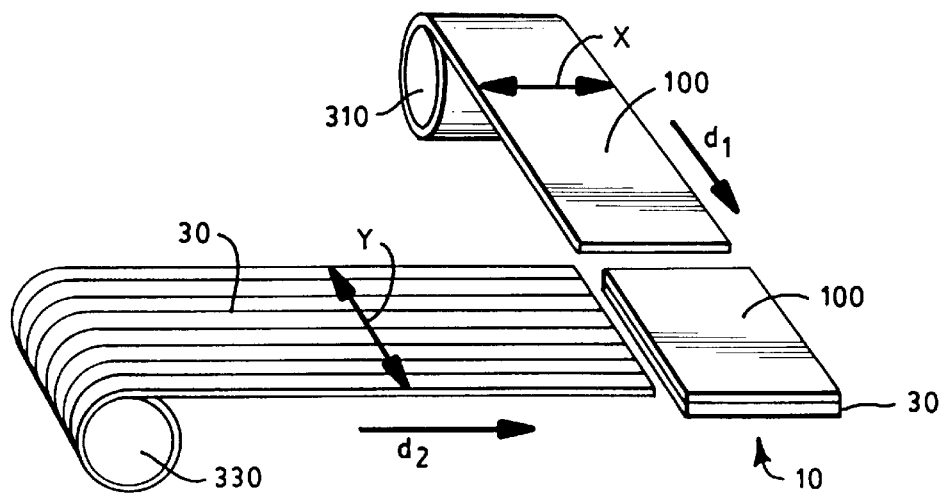
FIG. 8 illustrates schematically a process and apparatus for making the projection screen 10 illustrated in FIG. 7.

One particularly desirable mode of web-based continuous manufacture is illustrated in FIG. 8. As shown therein, on a first spool 310 there is provided a continuous web of holographic transmission diffuser element 100, the element being configured and spooled such that its predetermined horizontal viewing axis corresponds to (i.e., is aligned with) the web's cross-web axis x. On a second spool 330, there is provided a continuous web of uniaxial (i.e., cylindrical) light-collimating element 30, the element being configured and spooled such that its axis of collimation is aligned with the web's cross-web axis y, a condition that—in the case of a physical collimator— occurs when the linear "hills" and "valleys" of its topology are orthogonal to the cross-web axis y.

By drawing a length of elliptical diffuser 100 from spool 310 (cf., in downstream direction $d_1$) into substantially overlapping orthogonal relationship with a length of cylindrical collimator 30 drawn (cf., in downstream direction $d_2$) contemporaneously from spool 330, the two lengths can be bonded together and removed within the area of overlap to produce a projection screen 10. The resulting projection screen 10—which can include other elements—will comprise the holographic transmission diffuser and the cylindrical light-collimating element 30 positioned in proximate, overlapping relationship, such that the collimating axis of the cylindrical light-collimating element 30 is substantially orthogonal to the horizontal viewing axis of the elliptical holographic transmission diffuser element 100.

Regardless of whether a spherical, cylindrical or other form of collimator is employed, if at all, to work most effectively in a projection screen 10, transmission holographic diffuser element 100 should have a very high efficiency, e.g., a diffusion efficiency in the range of about 99.980% to 99.999%, and most preferably, greater than 99.990%. Below these efficiencies, projectors $40_R$, $40_G$, and $40_B$ may be visible to a viewer, producing an undesirable area of intense illumination, and washing out the image information in said area. However, this condition of "see through" can be remedied (to a point) by the addition in the projection screen 10 of a supplementary diffuser (not shown) such as, for example, General Electric's HS12 polycarbonate diffuser or 3M's DFA12 bulk diffuser. If the efficiency is less than 99.600% (i.e., 0.4% of the input light remaining undiffused), then even with addition of a supplementary diffuser, some residual defocused image of the projectors $40_R$, $40_G$, and $40_B$ will be visible, thus creating a highly undesirable "blob" of color.

The projection screen 10 of the present invention can be used to advantage in a variety of display systems. Even if color correction is not needed, the high efficiency of the holographic diffuser still provides advantage in respect of the reduction of "see through" and the reduction of bulk and weight. Displays wherein such would be useful would be microfilm readers, heads-up displays, and other like transmissive projection screens. Despite its alternate uses, use in a multi-tube rear screen projection television system 70 is the preferred application of projection screen 10.

Figure 3B:
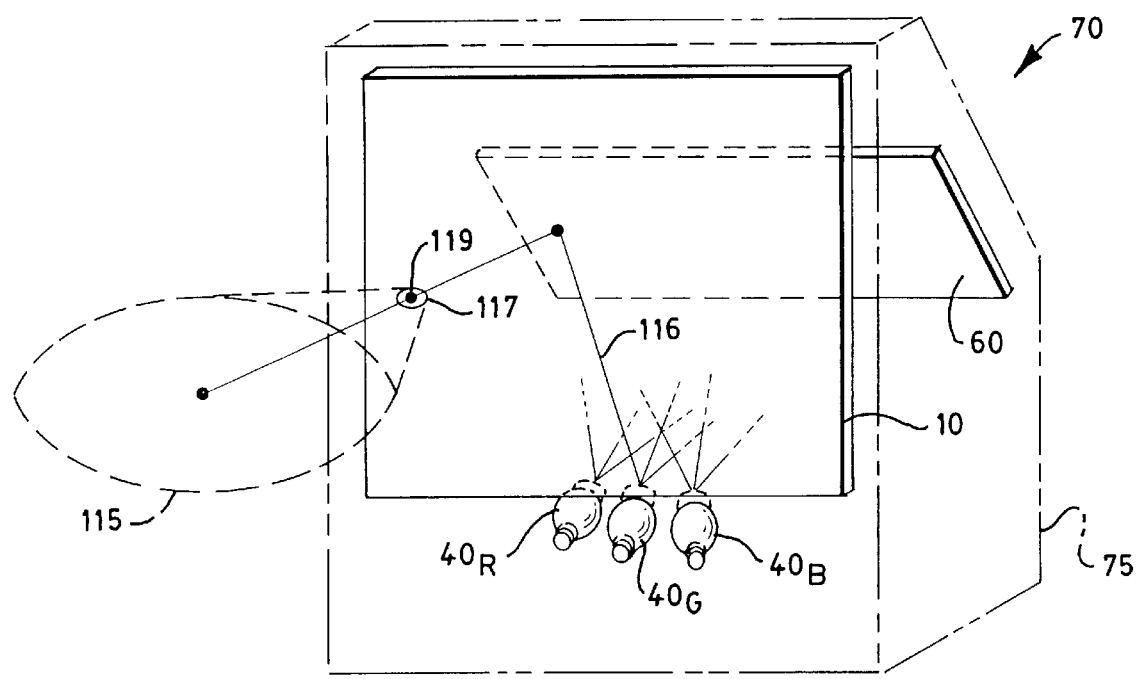
FIG. 3B illustrates schematically a rear screen projection television system 70 comprising a housing 75, an array of light projectors $40_R$, $40_G$, and $40_B$, a rear reflector 60, and a projection screen 10 according to the present invention. As illustrated, an incoming beam of light 116, having a circular profile 119, is diffused predominantly in one direction, creating a cone 115 of diffused rays with an elliptical base 117.

The essential components of a rear screen projection display system 70 are schematically illustrated in FIG. 3B. As shown, display system 70 comprises a cabinet 75 having a projection screen 10 disposed on a front viewing surface; and housing image projection means (see components $40_R$, $40_G$, and $40_B$) and reflector means 60 for directing projected image information from said image projection means toward a rear input surface of said projection screen 10.

With the use of conventional "black-stripe" lenticular projection screens, the horizontal offset angle of the blue and red projectors, $40_B$ and $40_R$, must typically be less than about 13°. The projection screen 10 of the present invention, however, can give satisfactory "whiteness" and color uniformity even when illuminated at offset angles as high as 30°. The capacity to accept such comparatively wide angles of incidence allows use of shorter focal length projectors 40$_R$, 40$_G$, and 40$_B$ closer to projection screen 10, thereby accommodating the design of a more compact rear projection screen television.

As indicated, image projection means will typically comprise three cathode ray tubes 40$_R$, 40$_G$, and 40$_B$ have red, green, and blue phosphors respectively on their picture screens. These are the three primary colors picture tubes of a conventional three-color projection television system. The green picture tube 40$_G$ is located centrally, and the red and blue picture tubes 40$_R$ and 40$_B$ are located on opposite sides of the green picture tube 40$_G$.

As shown in FIG. 3A, each picture tube 40$_R$, 40$_G$, and 40$_B$ is provided with a respective focusing lens assembly 42$_R$, 42$_G$, and 42$_B$. These serve to project the three primary color images upon a projection screen 10. Each of the picture tubes 40$_R$, 40$_G$, and 40$_B$ together with its focusing lens assembly 42$_R$, 42$_G$, and 42$_B$ constitutes an image projector which projects an image of a particular primary color upon the rear surface of projection screen 10, and the combination of colored images is seen by viewers on the front side of the screen who are located over a range of horizontal viewing angles, and whose head heights are distributed over a range of vertical viewing angles as well.

As shown in FIG. 3A, the centrally located green image projector 40$_G$, 42$_G$ has an optical axis which coincides with the normal axis of projection screen 10. Since only one of the image projectors can occupy this central position, the red and blue image projectors must necessarily be offset—typically along a horizontal axis—in some direction from the screen's normal axis as established by the green projector. The conventional arrangement, as illustrated, is for these to be horizontally displaced on opposite sides of the green projector. As discussed in the "Background" section, supra, it is this horizontal offset of the blue and red projectors which gives rise to the lateral color balance problem, the problem being ameliorated by the incorporation therein of holographic transmission diffuser element 100.

Although the exact structural basis for the properties accomplished by the holographic transmission diffuser element 100 are not very well understood, as stated above, holographic transmission diffusers elements possessing such properties have been consistently manufactured from an H1 master holographic transmission diffuser 100', which itself is made through a novel holographic exposure and development process. See FIG. 1.

According to said process, the H1 master holographic transmission diffuser 100' is made by first placing a holographic recording media 100' at a slight distance 40 away (preferably, about 6 mm) from a transmissive light diffusing optical tile 60, the holographic recording media 100' comprising a photosensitive layer 110 deposited on a light-transmissive substrate 120.

Light-transmissive substrate 120 can comprise any of a variety of sheet materials, although flexible polymeric sheet materials are preferred. Among preferred materials are polystyrene, polyethylene terephthalate, polyethylene, polypropylene, poly(vinyl chloride), polycarbonate, poly(vinylidene chloride), cellulose acetate, cellulose acetate butyrate, and copolymeric materials such as the copolymers of styrene, butadiene, and acrylonitrile, including poly(styrene-co-acrylonitrile). An especially preferred web material from the standpoints of durability, dimensional stability, and handling characteristics is polyethylene terephthalate. In a preferred embodiment, light-transmissive substrate 12 has a thickness of about 7 mil (0.178 mm).

Photosensitive layer 110 can be made of a variety of materials. Among the more important are: silver halide emulsions, hardened dichromated gelatin, ferroelectric crystals, photopolymers (e.g. Polaroid DMP-128, vinylcarbazole polymers, etc.), photochromics, and photodichroics. Characteristics of these materials are given in *Volume Holography and Volume Gratings*, by L. Solymar and D. J. Cook, Chapter 10, Academic Press, New York, 1981, pages 254–304. Compositions desirably considered for use include DMP-128 (a proprietary photopolymer from Polaroid Corporation), dichromated gelatin, silver-halide based compositions, and other compositions described in U.S. Pat. No. 4,588,664, issued to F. L. Fielding and R. T. Ingwall on May 13, 1986, and U.S. Pat. No. 4,696,876, issued to J. J. Cael on Sep. 29, 1987. Among these desirable compositions, Polaroid DMP-128—which comprises a dye sensitizer, a branched polyethylenimine, and a free radical polymerizable ethylenically unsaturated monomer—is preferred. Particular details of the composition may be found in the aforecited U.S. Pat. No. 4,588,664. See also, W. C. Hay and B. D. Guenther, "Characterization of Polaroid's DMP-128 Holographic Recording Medium", *Proceedings of the SPIE*, 883, pp. 102–105 (1988).

In exposing the holographic recording media 100', the light-diffusing optical tile 60 is irradiated with a thin width of light. The width of light being transposed gradually and sequentially downstream to thereby effect a scanwise exposure. Each input beam of light impinging on the light diffusing optical tile 60 will produce a diffraction pattern comprising beams of light diffracted substantially longitudinally (i.e., normal to the scanning direction d) and those diffracted substantially latitudinally (i.e., corresponding to the scanning direction d), each diffracted beam interfering with others when they meet in transit. Statistically, by such spaced-apart scanning exposure, the production and recordation of holographic interference fringes will occur more frequently as a result of two diffracted beams merging in the longitudinal/longitudinal direction, rather than in either the latitudinal/latitudinal direction or the longitudinal/latitudinal direction. This is because a substantial quantity of the latitudinally diffracted beams falls wide and outside of the comparatively thin area of record-producing interference 50, i.e., the area where beams merge and interfere with each other. Thus, exposure is skewed more predominantly toward the recordation of longitudinally diffracted beams. The result is an elliptical diffuser, which when later used as the light diffusing transmissive master in the scanning "contact-copy" method mentioned hereinbelow or in a repetition of the H1 manufacturing methodology will produce a highly-efficient H2 transmission diffuser element 100.

The spacing 40 between the holographic recording media 100' and the light diffusing optical tile 60' is preferably of a distance sufficient to assure non-contiguity of the proximately-positioned elements, i.e., about 3 to 6 mm, and thus effectively allowing the illuminated part of the diffuser to subtend nearly 180° along the direction of the scan. The resultant elliptical diffuser will have a minimum width of lateral diffusion greater than about 30°, a feature also believed to contribute to the color correction property of the projection screen 10.

Figure 1:
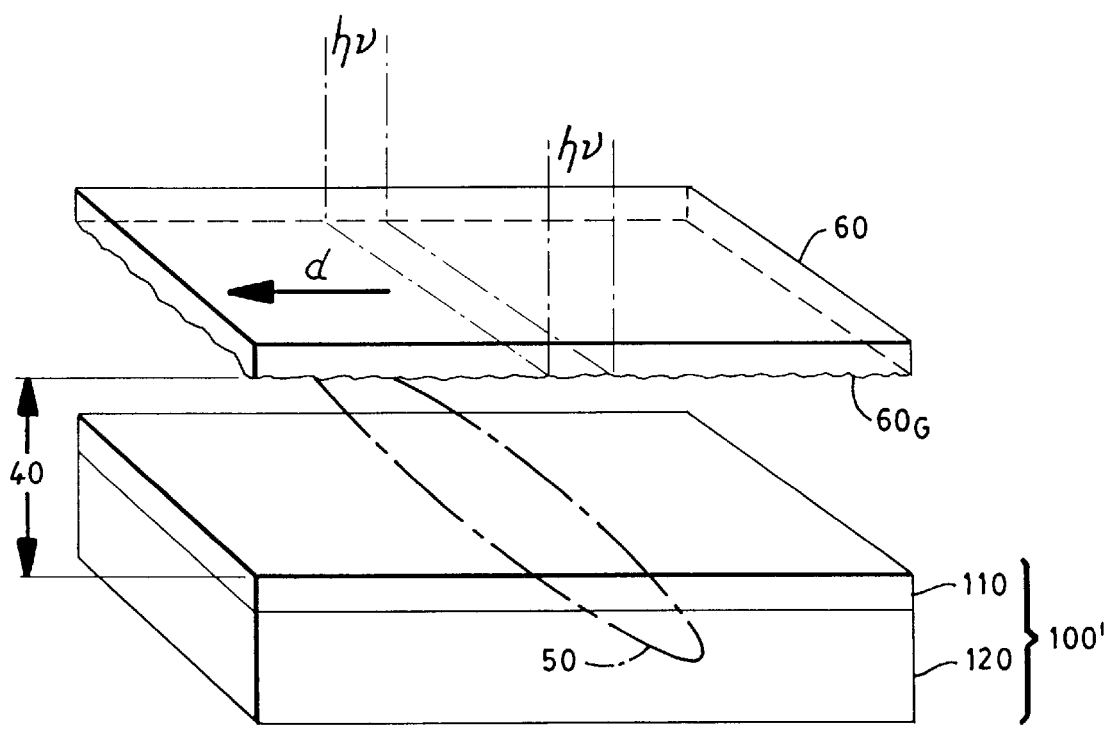
FIG. 1 illustrates schematically the scanning exposure of a photosensitive recording layer 110 through a diffuser 60 to produce a master holographic transmission diffuser (H1), the H1 transmission diffuser 100' useful in making a highly-efficient holographic transmission diffuser element (H2), the H2 diffuser element 100 suitable for incorporation into a projection screen 10 consistent with objects of the present invention.

As shown in FIG. 1, the ground glass surface 60g of the light diffusing optical tile 60 is facing the photosensitive layer 110 of recording medium 100', rather than being positioned as the input surface for reception of actinic radiation, hv. While this is not critical to the inventive methodology, it is a preferred mode of practice. It will be noted that a ground glass diffuser diffuses light only at its surface. By positioning the ground glass surface 60g toward the photosensitive layer 110, greater latitude is available in controlling the distance between the light diffusing surface of optical tile 60 and the photosensitive layer 110, hence, providing greater latitude in respect of the accomplishment of "overlap mismatch".

The aspect ratio of the diffusion cone (i.e., the ratio of its height to width) can in practice of the inventive methodology be designed to accomplish several and varied patterns and intensities of diffusion. Many of such designs will depend on the use and the viewing zone desired of the display system housing the projection screen. While the primary display system of interest—i.e., rear screen projection televisions—are currently manufactured such that the viewing zone is on a wide horizontal plane perpendicular to a viewing audience, it is envisioned that future systems may require dramatically different projection angles—which in part is also dependent on the television's internal optics. Of particular note is the desire for more compact projection television systems (i.e., short focal length projection television systems), wherein among other things comparatively more compressed optical distances would dictate a need for greater receptivity of obtuse angles of incidence.

A variety of possible formats can be accommodated by the inventive methodology without compromise to the need to still maintain good chromatic color balance. The aspect ratio of the diffuse output cone can be controlled—while still maintaining the efficient optical properties need for chromatic color balance—by varying the separation, 40, between the ground glass and the photosensitive medium, by varying the width of the scanning slit, by varying the diffusion properties of the original ground glass (by choosing different grades of grinding grit to create the diffuse surface), by using multiple ground glass diffuser elements, by using a lenticular film to accentuate angular dispersion of light along the scan line before it enters the photosensitive layer, and by a combination of all of these. Different optical properties can also be obtained depending on whether the slit is made by spreading a laser beam with a cylindrical lens or whether it is made by scanning a spot rapidly by means of an oscillating galvanometer (so-called 'flying spot' scanning). In particular, the aspect ratio of the diffuse output cone can be varied by changing the separation between the ground glass and the photosensitive medium. For example, by increasing the separation, 40, the resultant holographic diffuser becomes capable of producing comparably more linear diffuse cones. As the d approaches 0, i.e., when the ground glass diffuser approaches interfacial contact with the photosensitive medium, the resultant holographic diffusers become capable of producing comparably more circular diffuse cones.

The aspect ratio of the diffuse output cone can also be varied by modifying the width of the scanning slit. Thus, by increasing the width of the scanning slit to a certain extent (about 8 mm in preferred practice), it is possible to increase the angular size of the minor axis of an elliptical diffuse cone, and thereby, making the cone less elliptical. It has been observed that beyond 8 mm, the angular characteristics of the resultant holographic diffuser do not change significantly, and after that point, changes will result more likely from the diffuser-to-hologram separation or from the grade of ground glass used and the inherent diffusion cone of the ground glass.

As to the use of different grades of ground glass, it will be appreciated that in most instances, the results accomplished by different grades would for all practical purpose envisioned be virtually indistinguishable. However, with the use of coarser grades, the inherent diffusion of the ground glass—and therefore to some extent the copy—is wider. In the preferred mode of practice, ground glass having a 15 micron grit size is utilized.

The optical properties of the diffuse cone can also be altered by selecting alternate sources of exposure illumination. Exposure can be accomplished by utilizing either a uniaxially expanded beam (i.e., a beam expanded in a continuous line by a cylindrical lens so that light is always present simultaneously during recordation at every point along its uniaxial length) or an oscillating beam (i.e., a so-called "flying spot"). The selection of exposure illumination is important to the present invention because of its critical effect on the accomplishment of "overlap mismatch". With the use of a flying spot, at any given instant of recordation, the planar photosensitive layer 110 reacts only to the discrete diffuse spot made by the oscillating beam at any given instant in time. While this does not make a good elliptical diffuser for wide-angle viewable projection display systems, the resultant holographic diffuser is nonetheless a useful narrow-angle diffuser. In contrast, a cylindrical lens is fundamentally necessary when an original "H1" holographic elliptical diffuser is recorded, to ensure ellipticity. The cylindrical lens is less important when making an H2 hologram if the H1 hologram and H2 holographic medium are positioned in intimate contact (i.e., with no separation therebetween).

Although a scanning spot will not reproduce the full effect of a continuous line of light, some of the same effect may be obtained by optically stretching the spot (using a cylindrical lens) so that it has some length in the direction of oscillation. For example, it may be 10, 100, or 1000 times longer in the direction of the oscillation than perpendicular to it, somewhat cigar-shaped, or even longer. Then, at any instant, a point on the hologram "sees" a long narrow exposing area of the physical diffuser (or H1 hologram) that approaches in the angular instant the case of a continuously illuminated line.

Copying a holographic diffuser (i.e., the H1 hologram) made by the above methods, using the inventive method a second time, can also bring special advantages to optical performance.

Figure 4:
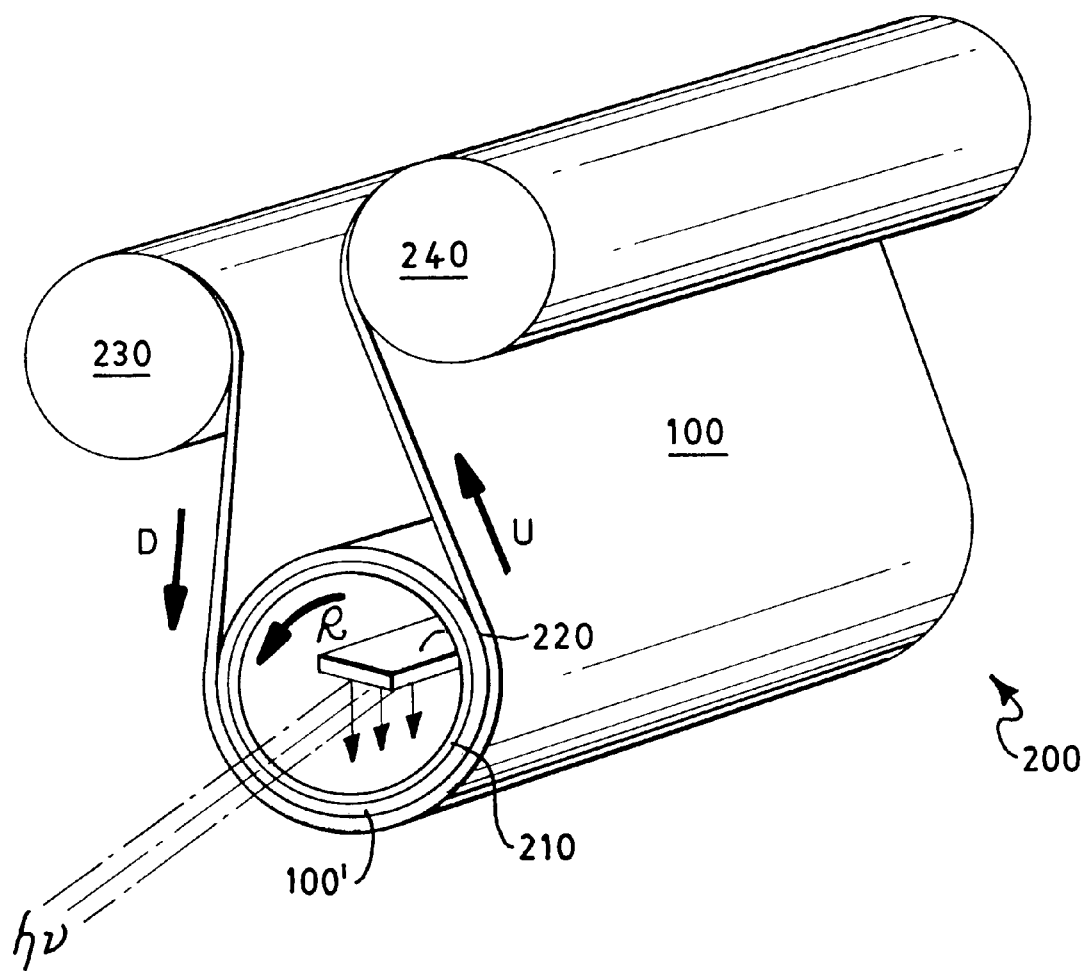
FIG. 4 illustrates schematically an apparatus 200 for making, on a continuous web, a holographic transmission diffuser element 100, the diffuser being of a configuration well-suited for incorporation into a projection screen in accordance with the present invention.

Likewise, the H1 hologram can be used as a "tool" for manufacturing highly-efficient H2 holographic diffusers. Standard contact-copy methodologies can be employed with either scanning or flood exposures. Alternatively, referring to FIG. 4, if a photosensitive film is drawn around a hollow-rotating transparent drum 210 wrapped with said H1 hologram 100', a scanning exposure line can lie crossways to the web direction, allowing continuous exposure of unlimited lengths. An apparatus for such methodology is described in International Patent Application PCT/US95/16203 of M. J. Molteni and M. M. Wenyon (published Jun. 27, 1996 as International Publication No. WO 96/19754). More particularly, in such apparatus 200, the H1 hologram 100' is provided on a hollow clear drum 210. Associated with the drum 210 are means for "fixedly directing" an irradiating wavefront into an open end of the drum and out through the H1 hologram 100', whereby light is directed at a substantially constant angle by a reflector 220 supported independently of the drum 210. In operation, as the drum 210 is continuously rotated, R, and as a web of recording medium 100 is continuously conveyed in register with the H1 hologram 100', the rotating H1 hologram 100' is exposed to the "fixedly directed" irradiating wavefront as it passes thereby. In essence, the H1 hologram 100' is sequentially exposed, and thereby "played back" onto a recording medium, by scan-wise irradiating said H1 hologram 100'. At exposure, the H1 hologram 100' redirects a portion of the impinging irradiation to generate a diffracted object beam or beams. The object beam thusly transmitted through the H1 hologram 100' and an undirected portion of the redirected irradiation (cf., reference beam) combine to form an interference pattern, the interference pattern being fixed by (i.e., recorded on) the photosensitive recording medium.

Regardless of the contact-copy methodology employed, preferred results are accomplished when the H1 is a moderately "weak" diffuser that transmits about the half the light undiffused. To reiterate, this undiffused light then acts as the 'reference beam' component in a conventional two-beam holographic exposure where the subject is the weak field of diffuse light generated by the H1 in addition to the undeviated 'zero order' reference beam. The principle benefit obtained is an increase in efficiency, an efficiency of the degree required to produce the highly-efficient H2 holographic diffusers used as transmissive holographic diffuser element 100 of projection screen 10.

We claim:

1. A projection screen for the viewing from the front side thereof of a multicolor image transmitted by projection therethrough projection screen having vertical and horizontal viewing axes and comprising:
   (a) a holographic transmission diffuser element capable of diffusing a beam of light into a forwardly-projected horizontally-elliptical cone; and
   (b) a light-collimating element capable of uniaxially-collimating by transmission an expanding wavefront projected therethrough, the light-collimating element positioned in substantially overlapping relationship with the holographic transmission diffuser element such that the axis of collimation of said light-collimating element is substantially orthogonal to said horizontal viewing axis.

2. The projection screen of claim 1, wherein said light-collimating element is a lenticular screen, the lenticular screen having a surface topology, the surface topology characterized by substantial cross-sectional uniformity in planes orthogonal to the horizontal viewing axis.

3. The projection screen of claim 2, wherein said lenticular screen is a fresnel lens having cylindrical optical properties.

4. A rear screen projection display system comprising:
   a cabinet with an opening in a foremost facing surface thereof;
   at least two horizontally-offset image projectors housed within said cabinet, each projector having a predetermined optical axis and each capable of projecting light bearing image information along a path directed ultimately toward and out of the opening in said cabinet, the projected light diverging from said optical axis as said light propagates along said path toward said opening; and
   a projection screen fitted into said opening to thereby intercept the diverging light propagated from each of said image projectors, the projection screen comprising (a) a holographic transmission diffuser element having a horizontal viewing axis and capable of diffusing a beam of light projected from any of said image projectors into a forwardly-projected horizontally-elliptical cone, and (b) a uniaxial light-collimating element positioned proximate to and in substantially overlapping relationship with said holographic transmission diffuser element, the light-collimating element positioned with its collimating axis substantially orthogonal to the horizontal viewing axis of said holographic transmission diffuser element.

5. The rear screen projection display system of claim 4, further comprising a reflective element, the reflective element positioned along said path intermediate said image projectors and said projection screen, said reflective element reflecting light intercepted from said image projectors such that the light impinges upon the light-collimating element at a substantially normal angle of incidence relative to the collimating axis of said light-collimating element.

6. The rear screen projection display system of claim 5, wherein said horizontally-offset image projectors consist essentially of a "green image"-dedicated projector, a "red image"-dedicated projector, a "blue-image"-dedicated projectors.

7. The rear screen projection display system of claim 6, wherein said "green image"-dedicated projector is position centrally between said "red image"-dedicated projector and said "blue image"-dedicated projector, light projected from said "green-image" dedicated projector propagating along a path traversing said opening at an angle substantially normal to the horizontal axis; said "blue-image"-dedicated projector and said "red-image"-dedicated projector each horizontally-offset ±10° from said "green-image"-dedicated projector.

8. The rear screen projection display system of claim 4, wherein said light-collimating element is a lenticular screen, the lenticular screen having a surface topology, the surface topology characterized by cross-sectional uniformity in planes orthogonal to the horizontal viewing axis.

9. The rear screen projection display system of claim 8, wherein said lenticular screen is a fresnel lens having cylindrical optical properties.

10. A method of manufacturing a holographic projection screen, the projection screen comprising a holographic transmission diffuser element having a predetermined horizontal viewing axis and a uniaxial light-collimating element, the method comprising the steps of:
    (a) providing on a first spool a continuous web of said holographic transmission diffuser element, said predetermined horizontal viewing axis being in alignment with the cross-web axis of said continuous web of said holographic transmission diffuser element;
    (b) providing on a second spool a continuous web of said uniaxial light-collimating element, the axis of collimation of said light-collimating element being in alignment with the cross-web axis of said continuous web of said light-collimating element;
    (c) drawing into substantially overlapping relationship a length of the web from said first spool and a length of the web from said second spool, whereby in the resulting area of overlap, said axis of collimation is substantially orthogonal to said predetermined horizontal viewing axis;
    (d) bonding together the lengths of webs within said area of overlap; and
    (e) removing the bonded lengths of webs within said area of overlap.

11. The method of claim 10, wherein said holographic transmission diffuser element is capable of diffusing a beam of light into a forwardly-projected elliptical cone, the longest diametric axis of said elliptical cone being substantially parallel to said predetermined horizontal viewing axis.

12. The method of claim 11, wherein said uniaxial light-collimating element is a fresnel lens having cylindrical optical properties.

* * * * *